UNITED STATES PATENT OFFICE.

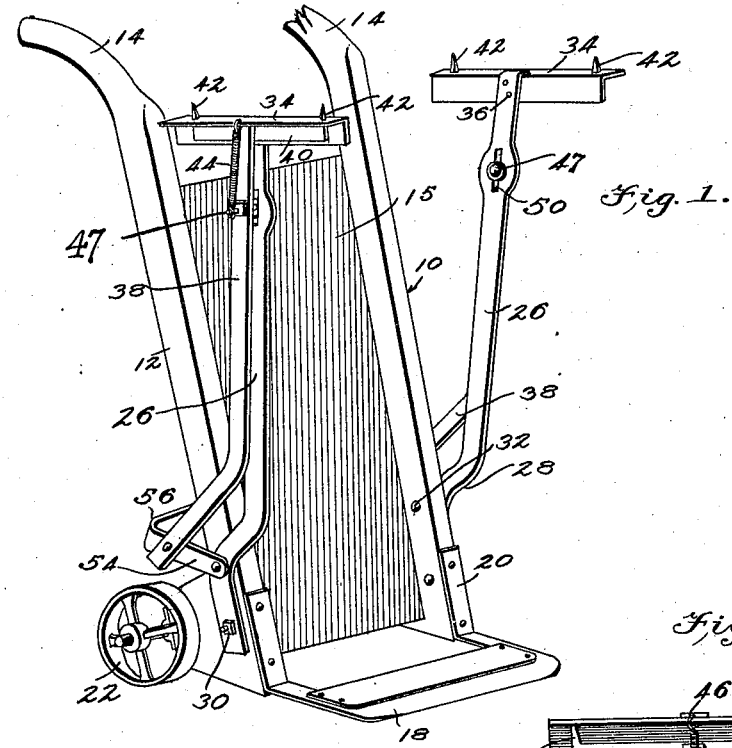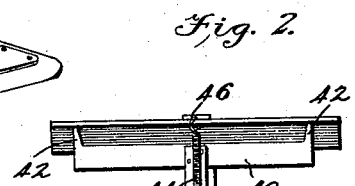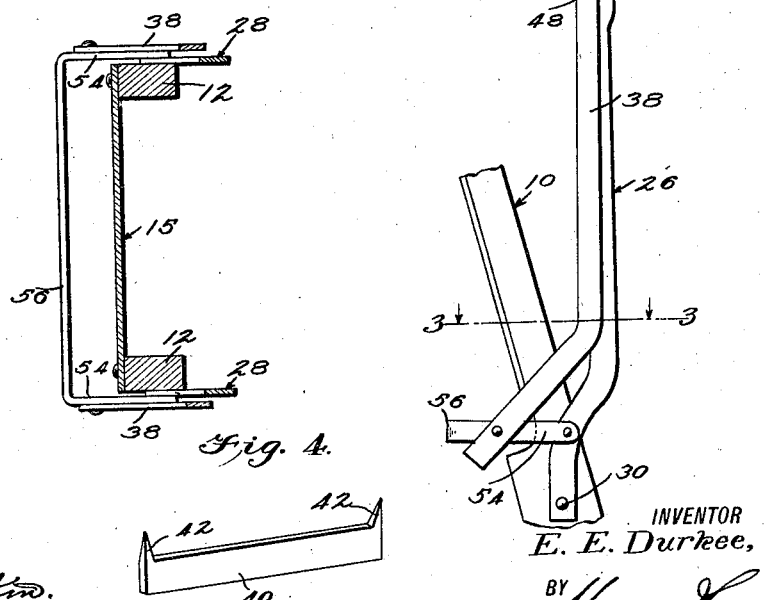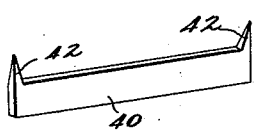

ERNEST EUGENE DURKEE, OF DEER RIVER, MINNESOTA.

BAG-HOLDER FOR TRUCKS.

1,390,346.

Specification of Letters Patent. Patented Sept. 13, 1921.

Application filed October 22, 1920. Serial No. 418,816.

*To all whom it may concern:*

Be it known that I, ERNEST E. DURKEE, a citizen of the United States, and a resident of Deer River, in the county of Itasca and State of Minnesota, have invented certain new and useful Improvements in Bag-Holders for Trucks, of which the following is a specification.

This invention relates to bag holders for trucks and the like.

An important object of the invention is to provide a bag holder for trucks which will not interfere with the use of the truck and which may be applied to a truck without elaborately altering the construction of the same.

A further object of the invention is to provide simple means whereby the bag may be released when desired.

The invention forming the subject matter of this application aims also to provide a bag holding means for hand trucks which is simple to operate, efficient in use, and cheap to manufacture.

Other objects and advantages of the invention will be apparent during the course of the following description.

In the accompanying drawing forming a part of this application and in which like numerals are employed to designate like parts throughout the same, Figure 1 is a fragmentary perspective of a hand truck having the improved bag holding means applied, Fig. 2 is a side elevation of the improved bag holding means applied, Fig. 3 is a horizontal sectional view taken on line 3—3 of Fig. 2, and Fig. 4 is a perspective of a bag engaging member embodied in the invention.

In the drawing wherein for the purpose of illustration is shown a preferred embodiment of the invention, the numeral 10 generally designates the hand truck adapted for carrying sacks of various material. The truck 10 is also adapted for carrying boxes and crates. As illustrated in Fig. 1 the truck embodies a pair of sides or beams 12 terminating in handles 14. A supporting body 15 is mounted between the spaced sides or beams 12 of the truck. As usual in trucks of this nature a shoe 18 is arranged at the forward end of the truck and is secured to the sides 12 of the same by means of attaching flanges 20. In the use of the truck the shoe 18 is of course adapted to be wedged beneath the lower end of the sack or the like so that the sack may be tilted onto the truck. The truck may be moved from place to place since the same is mounted upon wheels 22.

The improved bag holder forming the subject matter of this application embodies a pair of standards 26 having their lower portions curved as indicated at 28 and secured to the sides of the truck 10 by means of bolts 30 and 32. The standards 26 extend outwardly from the truck and have their upper portions secured to the intermediate portions of brackets 34 by means of rivets 36. As illustrated in Fig. 1, the pair of brackets 34 which are L-shaped in cross section are arranged in spaced parallel relation on opposite sides of the truck, so that when a bag is mounted upon the shoe 18 the upper portion of the bag will be arranged between the brackets 34.

A longitudinally movable arm 38 is associated with each standard 26 and has its upper portion rigidly connected to the intermediate portion of a cross head 40, having means for engaging the bag. The means for engaging the bag comprises upstanding teeth 42 formed on the ends of the cross heads and slidable through openings formed in the end portions of the brackets. When the upstanding teeth 42 formed at the ends of the cross heads 40 are extended through the brackets 34, the upper end of the bag may be engaged with the teeth whereby the bag will be securely held in such a position that the same may be readily filled. The portions of the bag between the pairs of teeth 42 will lie flatly in contact with the vertical portion of the brackets 34 so that a rectangular opening will be formed for the reception of the articles with which the bag is to be filled. The cross heads 40 and consequently the upstanding teeth 42 of the same are normally held in an elevated or operative position by means of retractile coiled springs 44 which have their upper portions formed with loops 46 engaged with the brackets and their lower portions formed with loops or hooks 48 engaged with combined stop elements and anchoring pins 47. The combined stop elements and anchoring pins 47 are rigidly connected to longitudinally movable arms 38 and therefore the springs 44 serve to elevate the arms whereby the teeth 42 are normally extended through the brackets 34.

The combined stop elements and anchoring pins 47 are slidable through slots 50 formed in the brackets 26, so that the longitudinal movement of the arms 38 with relation to the bracket is limited. By limiting the longitudinal movement of the arms 38 with relation to the standards 26 the teeth 42 are prevented from entirely leaving the openings through which the same pass. Should the teeth 42 at any time entirely leave the openings in the brackets 34 the same would not in all probability properly enter the openings when the arms are again elevated.

The lower portions of the arms 38 are curved rearwardly and are connected to the arms 54 of a U-shaped treadle or operating member 56. With reference to Fig. 3 it will be observed that the U-shaped treadle or operating member 56 is extended rearwardly of the truck and has its arms 54 pivoted to the bolts 32.

In the use of the improved truck the upper end of a bag is securely connected to the upstanding teeth 42 and the bag may be subsequently filled. Upon being filled the bag may be moved to the desired point, the teeth 42 serving as a means for holding the bag securely in position. When it is desired to release the bag the U-shaped treadle 56 may be moved downwardly by the movement of the foot so as to draw the arms 38 downwardly. The downward movement thus imparted to the arms 38 remove the upstanding teeth 42 from engagement with the sack whereby the sack is entirely free. The vertical flanges of the brackets 34 are arranged between the sack and the cross heads 40 so that there will be no frictional engagement between the cross head and the sack which would be likely to interfere with the downward movement of the cross head. Upon being released the arms 38 immediately move upwardly under the influence of the coiled springs 46 and the upstanding teeth 42 will at the same time move through the brackets 34.

The bag holding means forming the subject matter of this application does not interfere with the use of the truck for crate carrying purposes and the like.

Having thus described the invention, what I claim is:

1. The combination with a support, of brackets arranged on opposite sides of and in advance of the support, cross heads arranged at the outer sides of said brackets and having teeth extended upwardly through the brackets, a U-shaped treadle having sides pivoted to the sides of said support and having a connecting and foot engaging portion at the rear side of the support adjacent the lower end of the same, and means connecting the sides of said U-shaped treadle and said cross head.

2. The combination with a support, of brackets arranged on opposite sides of and in advance of the support, cross heads arranged at the outer sides of said brackets and having teeth extended upwardly through the brackets, of a U-shaped treadle having sides pivoted to the sides of said support and having a connecting and foot engaging portion at the rear side of the support, means connecting the sides of said U-shaped treadle and said cross head, and springs connecting said brackets and named means to hold the teeth in their elevated positions.

3. The combination with a frame, of brackets arranged on opposite sides of the frame, cross heads arranged at the outer sides of said brackets and having teeth extended upwardly through the brackets, of a U-shaped treadle having sides pivoted to the sides of said frame and having a connecting and foot engaging portion adjacent the lower end of the same, means connecting the sides of said U-shaped treadle and said cross head, and springs connecting said brackets and said means to hold the teeth in their elevated positions, said brackets being formed of angle iron having vertical portions arranged inwardly of said cross head and having horizontal portions arranged above the cross heads.

4. The combination with a frame, of a pair of standards arranged on opposite sides of the same, brackets secured to said standards, cross heads having teeth slidable through said brackets, arms connected to said cross heads, pins extending through said arms, coiled springs connecting said pins and said brackets for urging said cross heads and the teeth of the same upwardly, said standards being formed with slots slidably receiving said pins, the said pins being adapted to engage the lower end walls of said slots to limit the downward movement of said teeth, whereby to prevent withdrawal of the same from said brackets, and operating means for said arms.

5. A bag holder comprising a standard having a slot, a bracket carried by said standard and having openings, a cross head having bag engaging means slidable through said openings, an operating arm connected to said cross head and having a pin slidable in said slot, said pin being adapted to engage one end wall of said slot whereby to limit the withdrawal of said bag engaging means from said openings, and a spring connecting said pin and said bracket for urging said cross head to its operative position.

ERNEST EUGENE DURKEE.